United States Patent
Ricci et al.

(10) Patent No.: US 9,970,344 B2
(45) Date of Patent: May 15, 2018

(54) METHOD OF EVALUATING A SOOT QUANTITY ACCUMULATED IN A SELECTIVE CATALYTIC REDUCTION WASHCOATED PARTICULATE FILTER (SDPF)

(71) Applicant: GM GLOBAL TECHNOLOGY OPERATIONS LLC, Detroit, MI (US)

(72) Inventors: Isadora Ricci, Turin (IT); Alessandra Aceto, Turin (IT); Stefano Pellegrino, Trofarello (IT); Giuseppe Mazzara Bologna, Nicosia (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 236 days.

(21) Appl. No.: 15/059,654

(22) Filed: Mar. 3, 2016

(65) Prior Publication Data

US 2016/0258331 A1 Sep. 8, 2016

(30) Foreign Application Priority Data

Mar. 4, 2015 (GB) .................................. 1503698.1

(51) Int. Cl.
*F01N 3/00* (2006.01)
*F01N 3/20* (2006.01)
(Continued)

(52) U.S. Cl.
CPC ............. *F01N 3/208* (2013.01); *F01N 3/021* (2013.01); *F01N 3/035* (2013.01); *F01N 9/002* (2013.01); *F01N 2560/026* (2013.01); *F01N 2610/02* (2013.01); *F01N 2900/1402* (2013.01); *F01N 2900/1411* (2013.01); *F01N 2900/1602* (2013.01); *F01N 2900/1606* (2013.01); *F01N 2900/1614* (2013.01);
(Continued)

(58) Field of Classification Search
CPC ........... F01N 2560/026; F01N 2610/02; F01N 2900/1402; F01N 2900/1411; F01N 2900/1602; F01N 2900/1606; F01N 2900/1614; F01N 2900/1812; F01N 3/021; F01N 3/035; F01N 3/208; F01N 9/002; Y02T 10/24
USPC ................................................... 60/272–324
See application file for complete search history.

(56) References Cited

U.S. PATENT DOCUMENTS

| 8,191,357 B2 * | 6/2012 | Doring | ................... F01N 3/208 60/286 |
|---|---|---|---|
| 8,991,155 B2 * | 3/2015 | Larose, Jr. | ................ F01N 3/18 60/286 |

(Continued)

OTHER PUBLICATIONS

German Patent Office, German Search Report for German Application No. 1503698.1, dated Nov. 25, 2015.

*Primary Examiner* — Jesse Bogue
(74) *Attorney, Agent, or Firm* — Lorenz & Kopf LLP

(57) ABSTRACT

A method is disclosed for evaluating a soot quantity accumulated in a Selective Catalytic Reduction wash-coated particulate filter of an internal combustion engine. The internal combustion engine is equipped with an exhaust gas aftertreatment system including an urea injector. Using a map correlating a urea quantity value, a NOx quantity value, a temperature value and a mass flow value to a correction value of a soot quantity is used to correct an estimated value of the soot quantity in order to obtain an evaluated value of the soot quantity.

11 Claims, 3 Drawing Sheets

(51) Int. Cl.
  *F01N 9/00* (2006.01)
  *F01N 3/021* (2006.01)
  *F01N 3/035* (2006.01)

(52) U.S. Cl.
  CPC ....... *F01N 2900/1812* (2013.01); *Y02T 10/24* (2013.01); *Y02T 10/47* (2013.01)

(56) References Cited

U.S. PATENT DOCUMENTS

| | | | |
|---|---|---|---|
| 9,010,092 B2 * | 4/2015 | Jun | F01N 3/2066 60/286 |
| 9,133,752 B2 | 9/2015 | Jun | |
| 9,228,467 B2 * | 1/2016 | Swoish | B01D 53/9495 |
| 9,291,084 B2 * | 3/2016 | Larose, Jr. | F01N 3/035 |
| 2010/0101409 A1 * | 4/2010 | Bromberg | F01N 3/025 95/8 |
| 2015/0020508 A1 | 1/2015 | Machamer | |

* cited by examiner

METHOD OF EVALUATING A SOOT QUANTITY ACCUMULATED IN A SELECTIVE CATALYTIC REDUCTION WASHCOATED PARTICULATE FILTER (SDPF)

CROSS-REFERENCE TO RELATED APPLICATION

This application claims priority to Great Britain Patent Application No. 1503698.1, filed Mar. 4, 2015, which is incorporated herein by reference in its entirety.

TECHNICAL FIELD

The present disclosure pertains to a method of evaluating a soot quantity accumulated in a Selective Catalytic Reduction wash-coated particulate filter (SDPF).

BACKGROUND

A Diesel engine is conventionally equipped with an exhaust gas aftertreatment system that includes an exhaust gas pipe, for directing exhaust gases from the engine to the environment, and a plurality of aftertreatment devices located in the exhaust gas pipe, for reducing and/or removing pollutants from the exhaust gas before discharging it in the environment. In greater detail, a conventional aftertreatment system generally includes a Diesel Oxidation Catalyst (DOC), for oxidizing hydrocarbon (HC) and carbon monoxides (CO) into carbon dioxide ($CO_2$) and water ($H_2O$), and a Diesel Particulate Filter (DPF), located in the exhaust gas pipe downstream the DOC, for removing diesel particulate matter or soot from the exhaust gas. In order to reduce $NO_x$ emissions, most aftertreatment systems further include a Selective Reduction Catalyst (SCR), which is located in the exhaust gas pipe downstream of the DPF.

The SCR is a catalytic device in which the nitrogen oxides ($NO_x$) contained in the exhaust gas are reduced into diatomic nitrogen ($N_2$) and water ($H_2O$), with the aid of a gaseous reducing agent, typically ammonia ($NH_3$), that is absorbed inside the catalyst. The ammonia is obtained through thermo-hydrolysis of a Diesel Exhaust Fluid (DEF), typically urea ($CH_4N_2O$) that is injected into the exhaust gas pipe through a dedicated injector located between the DPF and the SCR.

More recently, Selective Catalytic Reduction wash-coated particulate filters (also referred to as SDPFs) have been introduced in the aftertreatment system architecture. A SDPF is an SCR (Selective Catalytic Reduction) catalyst coated on a porous DPF (Diesel Particular Filter).

In the aftertreatment system, a $NO_x$ sensor is provided to measure the $NO_x$ concentration values in the exhaust gas and the $NO_x$ values measured are sent to an electronic control unit (ECU), in order to calculate the quantity of DEF (Diesel Exhaust Fluid), typically urea, to be injected in the exhaust gas pipe for achieving an adequate $NO_x$ reduction inside the SCR portion of the SDPF.

It is also known in the art to estimate the quantity of soot accumulated in the DPF portion of the SDPF by means of a measure of a differential pressure between the inlet and the outlet of the DPF, for example employing respective pressure sensors, and then, using a model based on the physical characteristics of the DPF, referred in the following disclosure as physical soot model, the ECU calculates an estimated value of the soot quantity accumulated in the DPF.

This known physical soot model however is based on the hypothesis of a strict correlation between the pressure drop through the DPF and the soot quantity trapped thereon: however, this correlation is altered by the so-called CRT effect (Continuously Regenerating Trap), an apparent or effective spontaneous regeneration, which causes a pressure drop reduction across the DPF and eventually soot burning into the DPF. The occurrence of this phenomenon is basically dependent on the local temperature and it is mainly influenced by $NO_2$ levels across DPF.

In order to take into account this effect, a known physical soot model has been employed in the prior art. However, it has been observed that the known physical soot model is not able to correctly estimate the CRT effect for an SDPF architecture, since the continuous regeneration phenomenon is also influenced by the urea injection that occurs upstream of the SDPF. More particularly, in a SDPF architecture, in addition to the temperature, the soot estimation is also affected by differences in the $NO_2/NO_x$ ratio, a ratio that is modified by urea injection.

SUMMARY

The present disclosure provides an improved control strategy that is capable to correctly evaluate the CRT effect in all operating conditions of a SDPF, including all the situations in which it is necessary to take into account the effects of urea injection on the CRT phenomenon. The improved control strategy is achieved without using complex devices and by taking advantage from the computational capabilities of the Electronic Control Unit (ECU) of the vehicle.

An embodiment of the disclosure provides a method of evaluating a soot quantity accumulated in a Selective Catalytic Reduction wash-coated particulate filter of an internal combustion engine, the internal combustion engine being equipped with an exhaust gas aftertreatment system including an urea injector. An urea quantity value to be injected by the urea injector is determined, A $NO_x$ quantity value at an inlet of the selective catalytic reduction wash-coated particulate filter is determined. A temperature value at the inlet of the selective catalytic reduction wash-coated particulate filter is determined. A mass flow value of an exhaust gas is determined. A map correlating the urea quantity value, the $NO_x$ quantity value, the temperature value and the mass flow value is used to a correction value of a soot quantity. An estimated value of the soot quantity is corrected using the correction value in order to obtain an evaluated value of the soot quantity.

An advantage of this embodiment is that it extends the capabilities of the existing physical soot models to the SDPF architecture during urea (DEF) injection, considering that in future emission cycles, urea injections may be extended at medium or high engine loads. This embodiment leads to a more precise evaluation of soot stored in the DPF, avoiding over or under-estimation of the number of active regenerations necessary, allowing for a decrease in fuel consumption and in oil dilution and preventing DPF overloading.

According to another embodiment of the present disclosure, the map is subdivided in a first sub-map correlating the urea quantity value and the NOx quantity value to an intermediate value and in a second sub-map correlating the intermediate value, the temperature value and the mass flow value to the correction value. An advantage of this embodiment is that, by splitting the map in two or more sub-maps, the needed calculation can be easily programmed and added to the existing ECU software.

According to another embodiment of the present disclosure, the estimated value is determined on the basis of a pressure difference between the inlet and an outlet of the selective catalytic reduction wash-coated particulate filter. An advantage of this embodiment is that an existing soot physical model can be used.

According to another embodiment of the present disclosure, the urea quantity value is determined by an Electronic Control Unit. An advantage of this embodiment is that the injected urea quantity value used in the map is easily retrievable since it is the value determined by the ECU of the engine for each particular urea injection.

According to another embodiment of the present disclosure, the $NO_x$ quantity value at the inlet of the selective catalytic reduction wash-coated particulate filter is determined by a $NO_x$ quantity sensor located upstream of the selective catalytic reduction wash-coated particulate filter. An advantage of this embodiment is that a real-time $NO_x$ quantity value can be easily determined.

According to another embodiment of the present disclosure, the temperature value at the inlet of the selective catalytic reduction wash-coated particulate filter is determined by a temperature sensor located upstream of the selective catalytic reduction wash-coated particulate filter. An advantage of this embodiment is that areal-time SDPF inlet temperature value can be easily determined.

According to still another embodiment of the present disclosure, the mass flow value is determined by a mass flow sensor located in the exhaust gas aftertreatment system. An advantage of this embodiment is that a real-time exhaust mass flow value can be easily determined.

Another aspect of the present disclosure provides an apparatus for evaluating a soot quantity accumulated in Selective Catalytic Reduction wash-coated particulate filter of an internal combustion engine, the internal combustion engine being equipped with an exhaust gas aftertreatment system including an urea injector, the apparatus is configured to determine an urea quantity value to be injected by the urea injection, a $NO_x$ quantity value at an inlet of the selective catalytic reduction wash-coated particulate filter, a temperature value at the inlet of the selective catalytic reduction wash-coated particulate filter and a mass flow value of an exhaust gas. The apparatus is configured to use map correlating the urea quantity value, the NOx quantity value, the temperature value and the mass flow value to a correction value of a soot quantity, and correct an estimated value of the soot quantity using the correction value in order to obtain an evaluated value of the soot quantity.

An advantage of this embodiment is that it extends the capabilities of the existing physical soot model to the SDPF architecture during urea (DEF) injection, considering that in future emission cycles, urea injections may be extended at medium or high engine loads. This embodiment leads to a more precise evaluation of soot stored in the DPF, avoiding over or under-estimation of the number of active regenerations necessary, allowing for a decrease in fuel consumption and in oil dilution and preventing DPF overloading.

Another embodiment of the present disclosure provides an apparatus configured to use a map that is subdivided in a first sub-map correlating the urea quantity value and the $NO_x$ quantity value to an intermediate value and in a second sub-map correlating the intermediate value, the temperature value and the mass flow value to the correction value. An advantage of this embodiment is that, by splitting the map in two or more sub-maps, the needed calculation can be easily programmed and added to the existing ECU software.

According to another embodiment of the present disclosure, the apparatus is configured to determine the estimated soot quantity on the basis of a pressure difference between the inlet and an outlet of the selective catalytic reduction wash-coated particulate filler. An advantage of this embodiment is that an existing soot physical model can be used.

According to another embodiment of the present disclosure, the apparatus is configured to determine the urea quantity value. An advantage of this embodiment is that the injected urea quantity value used in the map is easily retrievable since it is the value determined by the ECU of the engine for each particular urea injection.

According to another embodiment of the present disclosure, the apparatus is configured to determine the $NO_x$ quantity value at the inlet of the selective catalytic reduction wash-coated particulate filter using a $NO_x$ quantity sensor located upstream of the selective catalytic reduction wash-coated particulate filter. An advantage of this embodiment is that a real-time $NO_x$ quantity value can be easily determined.

According to another embodiment of the present disclosure, the apparatus is configured to determine the temperature value at the inlet of the selective catalytic reduction wash-coated particulate filter using a temperature sensor located upstream of the selective catalytic reduction wash-coated particulate filter. An advantage of this embodiment is that a real-time SDPF inlet temperature value can be easily determined.

According to still another embodiment of the present disclosure, the apparatus is configured to determine the mass flow value using a mass flow sensor located in the exhaust gas aftertreatment system. An advantage of this embodiment is that a real-time exhaust mass flow value can be easily determined.

The method according to one of its aspects can be carried out with the aid of a computer program including a program-code for carrying out the method described above, and in the form of computer program product including the computer program. The computer program product can be embodied as a control apparatus for an internal combustion engine, including an Electronic Control Unit (ECU), a data carrier associated to the ECU, and the computer program stored in a data carrier, so that the control apparatus defines the embodiments described in the same way as the method. In this case, when the control apparatus executes the computer program all the steps of the method described above are carried out.

A still further aspect of the disclosure provides an internal combustion engine specially arranged for carrying out the method claimed.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
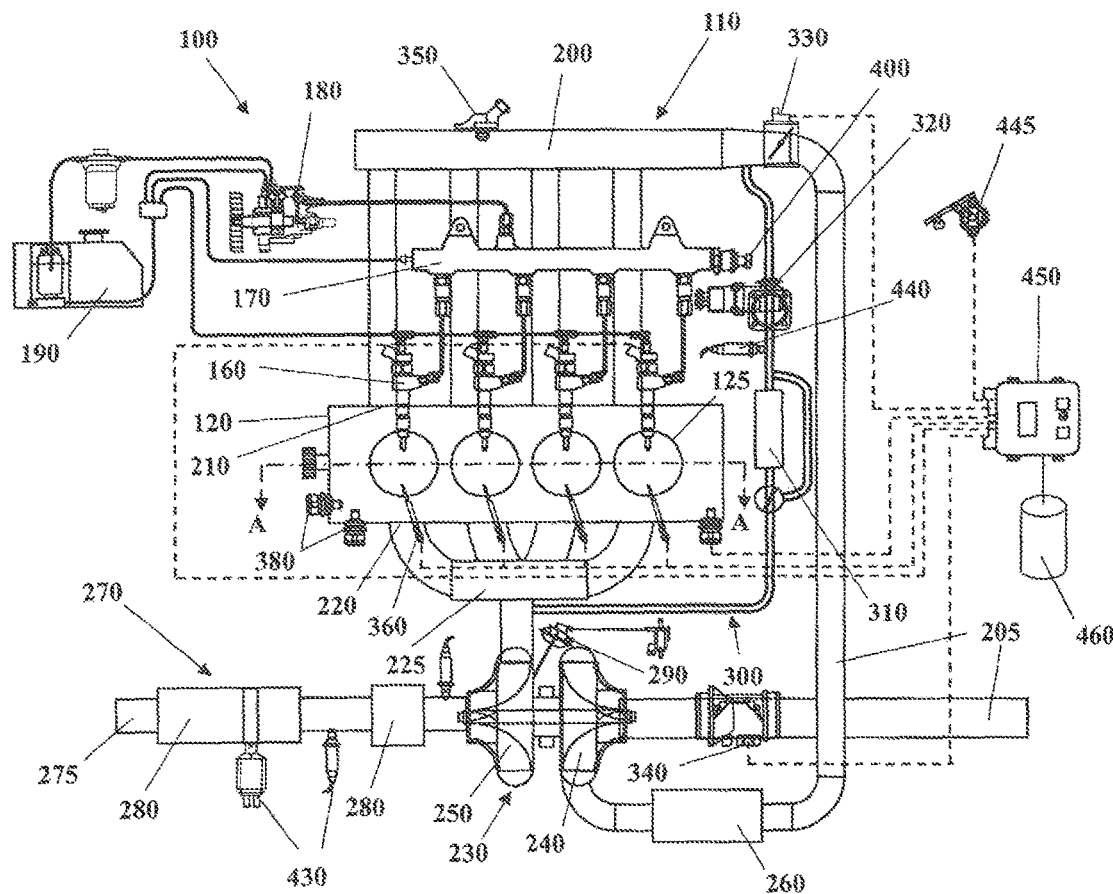
FIG. 1 shows an automotive system.
Figure 2:
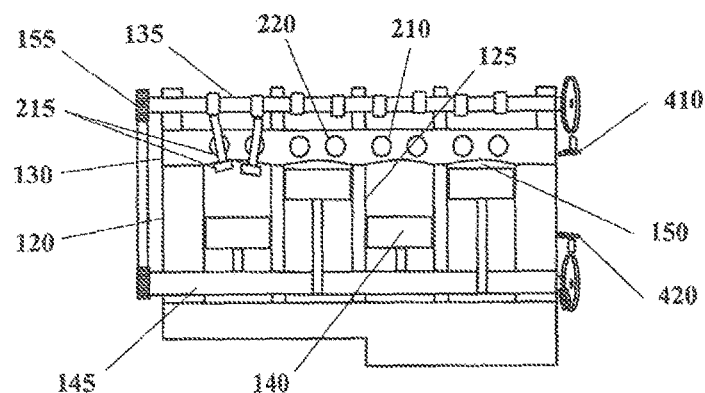
FIG. 2 is a cross-section of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The exhaust gas aftertreatment system 270 may include an exhaust pipe 275 having one or more exhaust aftertreatment devices 280. The aftertreatment devices may be any device configured to change the composition of the exhaust gases. Some examples of aftertreatment devices 280 include, but are not limited to, catalytic converters two and three way), oxidation catalysts, lean $NO_x$ traps, hydrocarbon adsorbers, selective catalytic reduction (SCR) systems, and particulate filters. Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system, or data carrier 460, and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carry out the steps of such methods and control the ICE 110.

The program stored in the memory system is transmitted from outside via a cable or in a wireless fashion. Outside the automotive system 100 it is normally visible as a computer program product, which is also called computer readable medium or machine readable medium in the art, and which should be understood to be a computer program code residing on a carrier, said carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing said computer program code is impressed on the transitory electromagnetic signal. Such signals are e.g. made use of when transmitting computer program code in a wireless fashion via a Wi-Fi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in an automotive vehicle.

Figure 3:
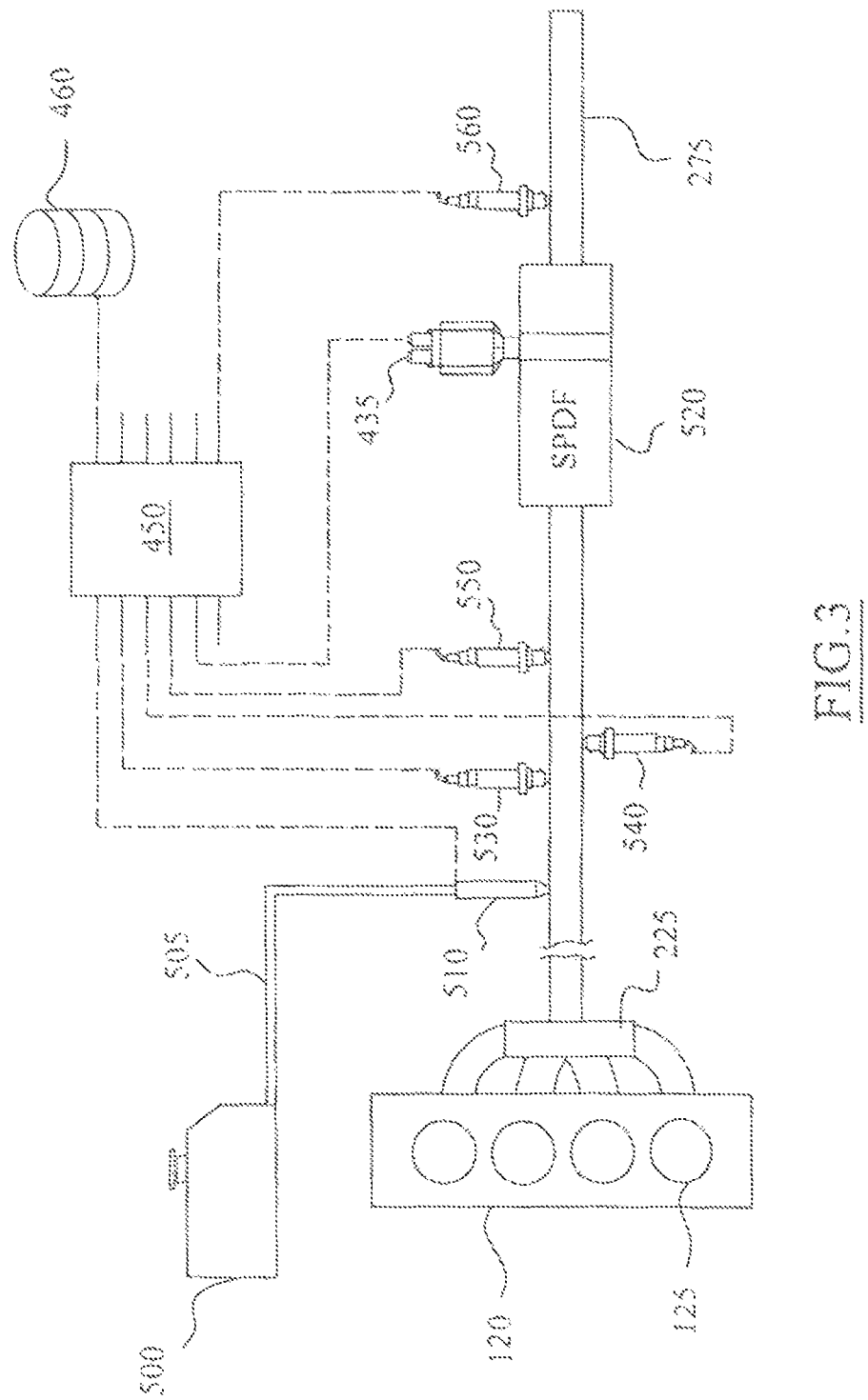
FIG. 3 is a schematic view of a portion of an aftertreatment system for an internal combustion engine.

More specifically, FIG. 3 illustrates a schematic view of a portion of the exhaust gas aftertreatment system 270 for an internal combustion engine 110. In the embodiment depicted in FIG. 3, the exhaust gas aftertreatment system 270 includes a SDPF 520, namely a DPF filter wash-coated with a Selective Catalytic Reduction (SCR) element.

A pressure sensor 550 is provided upstream of the SDPF 520 and a further pressure sensor 560 is provided downstream thereof, in such a way that the pressure values read by the pressure sensors 550, 560 can be communicated to the ECU 450 for the calculation of a differential pressure across the SDPF 520. Based on such differential pressure, the ECU 450 calculates an estimated value of the soot quantity accumulated in the DPF employing a known physical model.

The Selective Reduction Catalyst (SCR) portion in the SDPF 520 reduces the nitrogen oxides ($NO_x$) contained in the exhaust gas into diatomic nitrogen ($N_2$) and water ($H_2O$). The SDPF 520 is associated with an urea injector 510, which is located in the exhaust pipe 275 upstream of the SDPF 520 for injecting a Diesel Exhaust Fluid (DEF), in this case urea ($CH_4N_2O$), in the exhaust gas stream. Due to thermo-hydrolysis reactions occurring inside the exhaust pipe 275, urea is converted into a gaseous reducing agent, typically ammonia ($NH_3$), which is absorbed inside the SCR portion of the SDPF 520, so as to promote $NO_x$ reduction reactions.

Urea is contained in an urea tank 500 and reaches the urea injector 510 through an urea pipe 505. The injections of urea are commanded by the ECU 450, according to engine operating conditions or other parameters.

Upstream of the SDPF 520 a $NO_x$ quantity sensor 530 and a temperature sensor 540 are provided, for example, in the exhaust pipe 275. Furthermore, an exhaust mass flow sensor 435 is also provided in the exhaust pipe 275.

Figure 4:
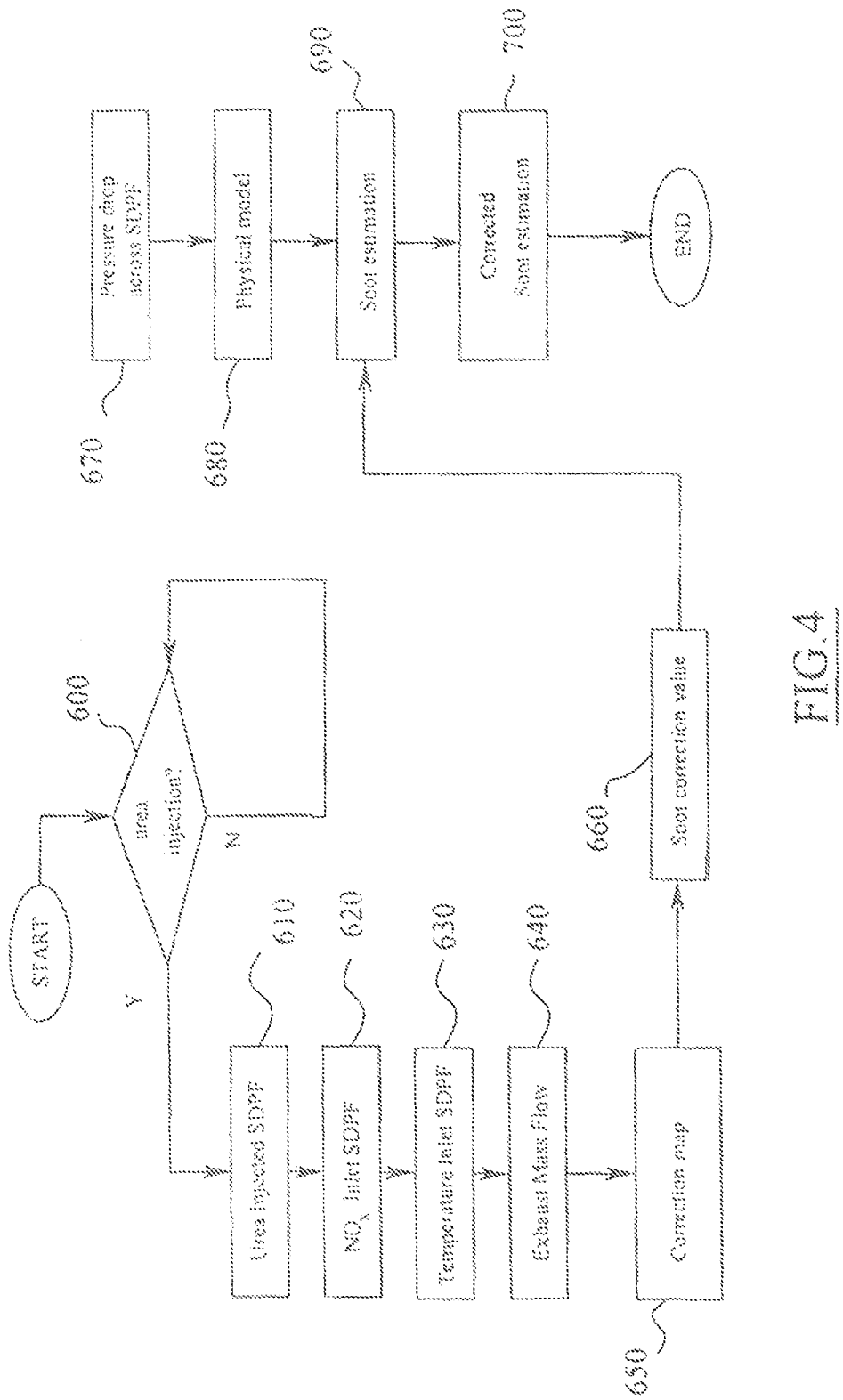
FIG. 4 is a flowchart describing an embodiment of the method of the present disclosure.

An embodiment of the method of the present disclosure will now be described with particular reference to the flowchart of FIG. 4. During the use of the automotive vehicle, a soot quantity accumulated into the SDPF 520 is estimated using a known physical model.

In particular, in the known physical model, a pressure difference across the SDPF 520 is measured, for example by employing the pressure sensor 550 upstream of the SDPF 520 and the further pressure sensor 560 downstream thereof (block 670). This pressure difference is used by the ECU 450 as input of the physical model (block 680) in order to calculate an estimated value SQest (block 690) of the soot quantity trapped into the SDPF 520.

Moreover, also during the use of the of the automotive vehicle, the ECU 450 monitors the necessity of performing an urea injection upstream of the SDPF 520 (block 600). In case no urea injection is performed, the estimation value SQest can be taken as a correct evaluation of the soot quantity accumulated in the SDPF 520. In an alternative, in the same case in which no urea injection is performed, a known further model can be employed to correct the estimated value SQest by means of the first known physical model.

However, according to an embodiment of the present disclosure, if a urea injection is performed, a correction value SQcorr of the soot quantity is calculated, taking into account also the value of an urea quantity U_inj to be injected by the urea injector 510.

In particular, the ECU 450 determines the urea quantity value U_inj and memorizes such value in the data carrier 460 (block 610) from which it can be used in the various embodiments of the method.

Also, a NO quantity value Inlet_$NO_x$ at the inlet of the SDPF 520 is determined, for example by reading the measurement of the NO quantity sensor 530 upstream of the SDPF 520 (block 620). Furthermore, a temperature value Inlet_temp at the inlet of the SDPF is determined, for example by reading the measurement of the temperature sensor 540 upstream of the SDPF 520 (block 630). Also, a mass flow value EMF of the exhaust gas in the exhaust line 275 is determined, for example by reading the measurement of the mass flow sensor 435 (block 640).

Then a map, pre-calibrated and stored in the data carrier 460, which correlates the urea quantity value U_inj, the NOx quantity value, the temperature value Inlet_temp and the mass flow value EMF is used (block 650) in order to calculate a correction value SQcorr (block 660) of the soot quantity. Finally, the estimated value SQest of the soot quantity is corrected, using the correction value SQcorr (block 700), in order to obtain an evaluated value SQeval of the soot quantity.

According to another embodiment of the present disclosure, the map is subdivided two sub maps pre-calibrated and stored in the data carrier 460, where in a first sub-map correlates the urea quantity value U_inj and the NO quantity value Inlet_NOx to an intermediate value SQint of the soot quantity, and a second sub-map correlates the intermediate value SQint, the temperature value Inlet_temp and the mass flow value EMF to a correction value SQcorr of the soot quantity.

The above subdivision of the map is not the only possible subdivision, since many other possibilities can be envisaged of organizing the required data to determine the correction value SQcorr of the soot quantity, starting from the urea quantity value U_inj, the $NO_x$ quantity value Inlet_$NO_x$ and the temperature value Inlet_temp at the inlet of the SDPF 520, and the mass flow value EMF depending on hardware and/or software requirements.

The map correlating the urea quantity value U_inj, the NOx quantity value Inlet_$NO_x$ and the temperature value Inlet_temp at the inlet of the SDPF 520, and the mass flow value EMF with the correction value SQcorr can be determined by means of an experimental activity and then stored in the data carrier 460 associated to the ECU 450.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method of evaluating a soot quantity accumulated in a Selective Catalytic Reduction wash-coated particulate filter of an internal combustion engine having an exhaust gas aftertreatment system including a urea injector, the method comprising:
   determining an urea quantity value to be injected by the urea injector;
   determining a $NO_x$ quantity value at an inlet of the selective catalytic reduction wash-coated particulate filter;
   determining a temperature value at the inlet of the selective catalytic reduction wash-coated particulate filter;
   determining a mass flow value of an exhaust gas in the aftertreatment system;

computing a correction value of a soot quantity using a map correlating the urea quantity value, the $NO_x$ quantity value, the temperature value and the mass flow value; and correcting an estimated value of the soot quantity using the correction value in order to obtain an evaluated value of the soot quantity.

2. The method according to claim 1, wherein subdividing the map in a first sub-map correlating the urea quantity value and the $NO_x$ quantity value to an intermediate value and a second sub-map correlating the intermediate value, the temperature value and the mass flow value to the correction value.

3. The method according to claim 1, further comprising determining the estimated value on the basis of a pressure difference between the inlet and an outlet of the selective catalytic reduction wash-coated particulate filter.

4. The method according to claim 1, further comprising determining the urea quantity value in an electronic control unit.

5. The method according to claim 1, further comprising determining the $NO_x$ quantity value at the inlet of the selective catalytic reduction wash-coated particulate filter using a $NO_x$ quantity sensor located upstream of the selective catalytic reduction wash-coated particulate filter.

6. The method according to claim 1, further comprising determining the temperature value at the inlet of the selective catalytic reduction wash-coated particulate filter using a temperature sensor located upstream of the selective catalytic reduction wash-coated particulate filter.

7. The method according to claim 1, further comprising determining the mass flow value (EMF) using a mass flow sensor located in the exhaust gas aftertreatment system.

8. A computer program comprising a computer-code stored in a non-transitory computer-readable media for performing the method according to claim 1.

9. A control apparatus for an internal combustion engine, comprising an electronic control unit, a non-transitory computer-readable data carrier associated to the electronic control unit and a computer program according to claim 8 stored in the data carrier.

10. An apparatus for evaluating a soot quantity accumulated in a selective catalytic reduction wash-coated particulate filter of an internal combustion engine having an exhaust gas aftertreatment system including a urea injector, wherein the apparatus comprises a electronic control unit for controlling the urea injector and configured to:

determine a urea quantity value to be injected by the urea injector;

determine a $NO_x$ quantity value at an inlet of the selective catalytic reduction wash-coated particulate filter;

determine a temperature value at the inlet of the selective catalytic reduction wash-coated particulate filter;

determine a mass flow value of an exhaust gas; and determine a correction value of the soot quantity using a map correlating the urea quantity value, the NOx quantity value, the temperature value and the exhaust mass flow value;

correcting an estimated value of the soot quantity using the correction value in order to obtain an evaluated value of the soot quantity.

11. An internal combustion engine comprising an exhaust gas aftertreatment system including a urea injector, and the electronic control unit according to claim 10 for controlling the urea injector.

* * * * *